US012773740B2

(12) United States Patent
Hecht

(10) Patent No.: US 12,773,740 B2
(45) Date of Patent: Oct. 27, 2026

(54) TOOL BODY HAVING CLAMPING JAW WITH RESILIENT CLAMPING PORTION AND CUTTING TOOL

(71) Applicant: ISCAR, LTD., Tefen (IL)

(72) Inventor: Gil Hecht, Nahariya (IL)

(73) Assignee: ISCAR, LTD., Tefen (IL)

( * ) Notice: Subject to any disclaimer, the term of this patent is extended or adjusted under 35 U.S.C. 154(b) by 329 days.

(21) Appl. No.: 18/442,458

(22) Filed: Feb. 15, 2024

(65) Prior Publication Data

US 2025/0262677 A1 Aug. 21, 2025

(51) Int. Cl.

| | |
|---|---|
| ***B23C 5/22*** | (2006.01) |
| *B23B 27/04* | (2006.01) |
| *B23B 29/04* | (2006.01) |

(52) U.S. Cl.

CPC .......... *B23C 5/22* (2013.01); *B23C 2200/369* (2022.02)

(58) Field of Classification Search

CPC . B23C 5/22; B23C 2200/369; B23B 2205/02; B23B 2260/0785; B23B 29/043; B23B 27/04

See application file for complete search history.

(56) References Cited

U.S. PATENT DOCUMENTS 5,697,271 A * 12/1997 Friedman ................ B23B 27/04 407/50
5,799,554 A * 9/1998 Friedman ................ B23B 27/04 407/50
6,176,649 B1 * 1/2001 Friedman ................ B23B 27/04 407/117
6,572,309 B2 * 6/2003 Hansson ................ B23B 27/04 407/109
7,524,147 B2 * 4/2009 Hecht ...................... B23B 27/04 407/107
8,647,029 B2 * 2/2014 Hecht ................... B23B 27/045 407/107
8,696,259 B2 * 4/2014 Hecht ...................... B23B 27/10 407/101

(Continued)

FOREIGN PATENT DOCUMENTS

EP 2821167 A1 * 1/2015 ............. B23B 27/04
KR 20140125769 A * 10/2014 ............. B23B 27/10

OTHER PUBLICATIONS

International Search Report and Written Opinion dated May 26, 2025, issued in PCT counterpart application No. PCT/IL2025/050002.

*Primary Examiner* — Bayan Salone
(74) *Attorney, Agent, or Firm* — Womble Bond Dickinson (US) LLP

(57) ABSTRACT

A tool body has base and clamping jaws which are spaced apart by a clamping recess. The clamping jaw is resiliently movable with respect to the base jaw. The clamping recess includes an insert receiving pocket and a clamping flexibility recess extending from the insert receiving pocket. The clamping jaw includes a flexible overhanging clamping portion, and a fixed clamping portion connected by a hinge clamping portion, the flexible overhanging clamping portion being delimited by the insert receiving pocket and a clamping flexibility recess. The clamping recess comprises an innermost clamping recess point which is located at the clamping flexibility recess.

28 Claims, 4 Drawing Sheets

(56) References Cited

U.S. PATENT DOCUMENTS

| | | | | |
|---|---|---|---|---|
| 9,033,622 | B2 * | 5/2015 | Hecht | B23B 29/043 407/107 |
| 9,050,658 | B2 * | 6/2015 | Hecht | B23B 27/04 |
| 9,120,239 | B2 * | 9/2015 | Hecht | B23B 27/04 |
| 9,242,300 | B2 * | 1/2016 | Kaufmann | B23C 5/22 |
| 10,493,539 | B2 * | 12/2019 | Athad | B23B 27/086 |
| 10,953,474 | B2 * | 3/2021 | Hecht | B23B 29/08 |
| D930,723 | S * | 9/2021 | Shin | B23B 29/043 D15/140 |
| 11,806,793 | B2 * | 11/2023 | Athad | B23B 29/043 |
| 2002/0054792 | A1 * | 5/2002 | Hansson | B23B 27/04 407/109 |
| 2013/0170918 | A1 * | 7/2013 | Hecht | B23B 29/04 29/426.6 |
| 2013/0202372 | A1 | 8/2013 | Hecht | |
| 2014/0030035 | A1 * | 1/2014 | Hecht | B23B 27/045 407/115 |
| 2014/0234040 | A1 * | 8/2014 | Hecht | B23B 27/04 407/107 |
| 2018/0229315 | A1 * | 8/2018 | Athad | B23C 5/08 |
| 2019/0160555 | A1 * | 5/2019 | Hecht | B23C 5/2298 |
| 2020/0298319 | A1 | 9/2020 | Hecht et al. | |

* cited by examiner

TOOL BODY HAVING CLAMPING JAW WITH RESILIENT CLAMPING PORTION AND CUTTING TOOL

FIELD OF THE INVENTION

The subject matter of the present application relates to tool bodies, and in particular to such tool bodies having an insert receiving pocket defined by two jaws, and further in particular to such jaws where one of the jaws has a resilient clamping portion defined by a flexibility slot, and yet further in particular when the flexibility slot has a keyhole portion formed therein.

BACKGROUND OF THE INVENTION

Cutting tools for grooving/parting/slitting cutting operations on a workpiece can include an insert holder, and a cutting insert releasably and resiliently clamped in an insert receiving pocket. The insert holder can include upper and lower jaws spaced apart by a clamping recess and connected by a hinge portion. The upper jaw is resiliently movable with respect to the lower jaw. An example of such a tool body is disclosed in, for example, U.S. Pat. No. 9,033,622 B2.

Additionally, the lower jaw can also include a resilient clamping member. An example of such a tool body is disclosed in U.S. Pat. No. 9,120,239 B2, which discloses a resilient lower jaw tongue.

SUMMARY OF THE INVENTION

In accordance with a first aspect of the subject matter of the present application there is provided a tool body having a body central axis defining opposite forward to rearward directions, the tool body comprising:

- two body side surfaces and a body peripheral surface extending therebetween, the body peripheral surface including a body forward end surface at a forward end of the tool body, the body peripheral surface extending circumferentially along a body lateral axis which is perpendicular to, and intersects, the body central axis;
- spaced apart base and clamping jaws connected by a jaw connecting bridge;
- a clamping recess recessed in the body peripheral surface and opening out to the two body side surfaces, the clamping recess comprising:
  - an insert receiving pocket extending along a pocket axis defining opposite outward and inward directions, the insert receiving pocket having a pocket opening which opens out to the body forward end surface in the outward direction along the pocket axis, the insert receiving pocket being defined, at least partially, by pocket base and clamping surfaces formed on the base and clamping jaws, respectively;
  - a clamping flexibility recess extending from the insert receiving pocket and terminating at a recess termination portion, the clamping flexibility recess comprising a keyhole portion configured designed to receive a prong of a key; wherein:
    - the clamping jaw comprises a flexible overhanging clamping portion and a fixed clamping portion connected by a hinge clamping portion, the hinge clamping portion being adjacent the body forward end surface;
    - the flexible overhanging clamping portion is delimited by the insert receiving pocket and the clamping flexibility recess;
    - the flexible overhanging clamping portion comprises opposite free and fixed ends, the fixed end being closer to the pocket opening than the free end; and
    - the clamping recess comprises an innermost clamping recess point which is located at the clamping flexibility recess.

In accordance with a second aspect of the subject matter of the present application there is provided a tool body of the type described above; and

- a cutting insert, releasably and resiliently clamped in the insert receiving pocket between the base and clamping jaws.

It is understood that the above-said is a summary, and that features described hereinafter may be applicable in any combination to the subject matter of the present application, for example, any of the following features may be applicable to the tool body or cutting tool.

The clamping flexibility recess can comprise a major clamping flexibility recess and a minor clamping flexibility recess. The flexible overhanging clamping portion can be delimited on one side by the major clamping flexibility recess and on an opposite side by the insert receiving pocket and the minor clamping flexibility recess. The keyhole portion can be located at least in the minor clamping flexibility recess.

The keyhole portion can be located entirely in the minor clamping flexibility recess.

The keyhole portion can be spaced apart from the major clamping flexibility recess.

The keyhole portion can be spaced apart from the insert receiving pocket.

The flexible overhanging clamping portion can be resiliently displaceable about the hinge clamping portion towards the fixed clamping portion along a jaw opening direction.

The keyhole portion can comprise keyhole bearing and biasing surfaces, the keyhole bearing surface being located on the jaw connecting bridge.

The keyhole biasing surface can be located on the flexible overhanging clamping portion.

The clamping flexibility recess can comprise a recess slit portion merging with the keyhole portion and the recess terminating portion. In a side view of the tool body, the recess slit portion can be narrower than the keyhole portion.

In a side view of the tool body, the recess slit portion can be narrower than the recess termination portion.

The pocket base and clamping surfaces can comprise a pocket base abutment surface and at least one pocket clamping abutment surface, respectively, for clamping engagement with corresponding surfaces on a cutting insert, the at least one pocket clamping abutment surface being located on the flexible overhanging clamping portion and on the hinge clamping portion.

The pocket clamping surface can comprise two raised pocket clamping abutment surfaces spaced apart from one another along the pocket axis. One of the two pocket clamping abutment surfaces can be located on the flexible overhanging clamping portion and the other one of the two pocket clamping abutment surfaces can be located on the hinge clamping portion.

The insert receiving pocket can comprise an outward facing pocket stopper surface, for positioning a cutting insert in a predetermined position along the pocket axis.

The flexible overhanging clamping portion can comprise an innermost overhanging clamping portion point. The innermost overhanging clamping portion point can be located further inward along the pocket axis than the pocket stopper surface.

The pocket stopper surface can be located on the jaw connecting bridge and can be intersected by the pocket axis.

The clamping flexibility recess can extend from the insert receiving pocket between the pocket stopper surface and the pocket clamping surface.

The keyhole biasing surface can be located on the free end of the flexible overhanging clamping portion.

The clamping flexibility recess can comprise a major clamping flexibility recess and a minor clamping flexibility recess. The flexible overhanging clamping portion can be delimited on one side by the major clamping flexibility recess, and on another side by the insert receiving pocket and the minor clamping flexibility recess. The keyhole portion can be located at least in the minor clamping flexibility recess. The insert receiving pocket can comprise a pocket median plane containing the pocket axis and extending between the pocket base and clamping surfaces, the pocket median plane being parallel to the body lateral axis. The minor and major clamping flexibility recesses can both be located on a common, second plane side of the pocket median plane.

The clamping recess can comprise an insert clearance gap merging with the insert receiving pocket between the pocket stopper surface and the pocket base surface. The insert clearance gap can be located on an opposite, first plane side of the pocket median plane.

The clamping flexibility recess can comprise an outermost clamping flexibility recess point, along the pocket axis. The outermost clamping flexibility recess point can be located further outward than a mid-point of the pocket clamping surface, the mid-point being located half-way along the length of the pocket clamping surface in a direction along the pocket axis.

The base jaw can comprise an outermost base jaw point. The outermost clamping flexibility recess point can be located further inward along the pocket axis than the outermost base jaw point.

The recess termination portion can form an outermost portion of the clamping flexibility recess.

The flexible overhanging clamping portion can taper in a direction towards the free end.

The base jaw can be rigid.

The clamping jaw can be devoid of a through hole opening out to the two body side surfaces and spaced apart from the clamping recess.

The insert receiving pocket can be elongated along the pocket axis.

The base jaw can be shorter than the clamping jaw in the outward direction along the pocket axis.

The cutting insert can be longitudinally elongated in a direction defining an insert central axis and can comprise opposite first and second insert end surfaces and an insert peripheral surface extending therebetween. The insert peripheral surface can extend circumferentially about the insert central axis and comprise opposite insert upper and lower surfaces and two opposite insert side surfaces which all connect the first and second insert end surfaces. A cutting edge can be formed at the intersection of the insert upper surface and the first insert end surface. The insert lower surface can comprise at least one insert lower abutment surface. The insert upper surface can comprise an insert upper abutment surface which mutually faces away from the at least one insert lower abutment surface. The second insert end surface can comprise an insert stopper surface.

The pocket base and clamping surfaces can comprise a pocket base abutment surface and at least one pocket clamping abutment surface, respectively, for clamping engagement with corresponding surfaces on the cutting insert, the at least one pocket clamping abutment surface being located on the flexible overhanging clamping portion and on the hinge clamping portion. The at least one pocket clamping abutment surface can abut the at least one insert lower abutment surface. The pocket base abutment surface can abut the insert upper abutment surface.

The insert receiving pocket can comprise an outward facing pocket stopper surface, for positioning the cutting insert in a predetermined position along the pocket axis. The pocket stopper surface can abut the insert stopper surface.

BRIEF DESCRIPTION OF THE FIGURES

For a better understanding of the present application and to show how the same may be carried out in practice, reference will now be made to the accompanying drawings, in which.

Figure 1:
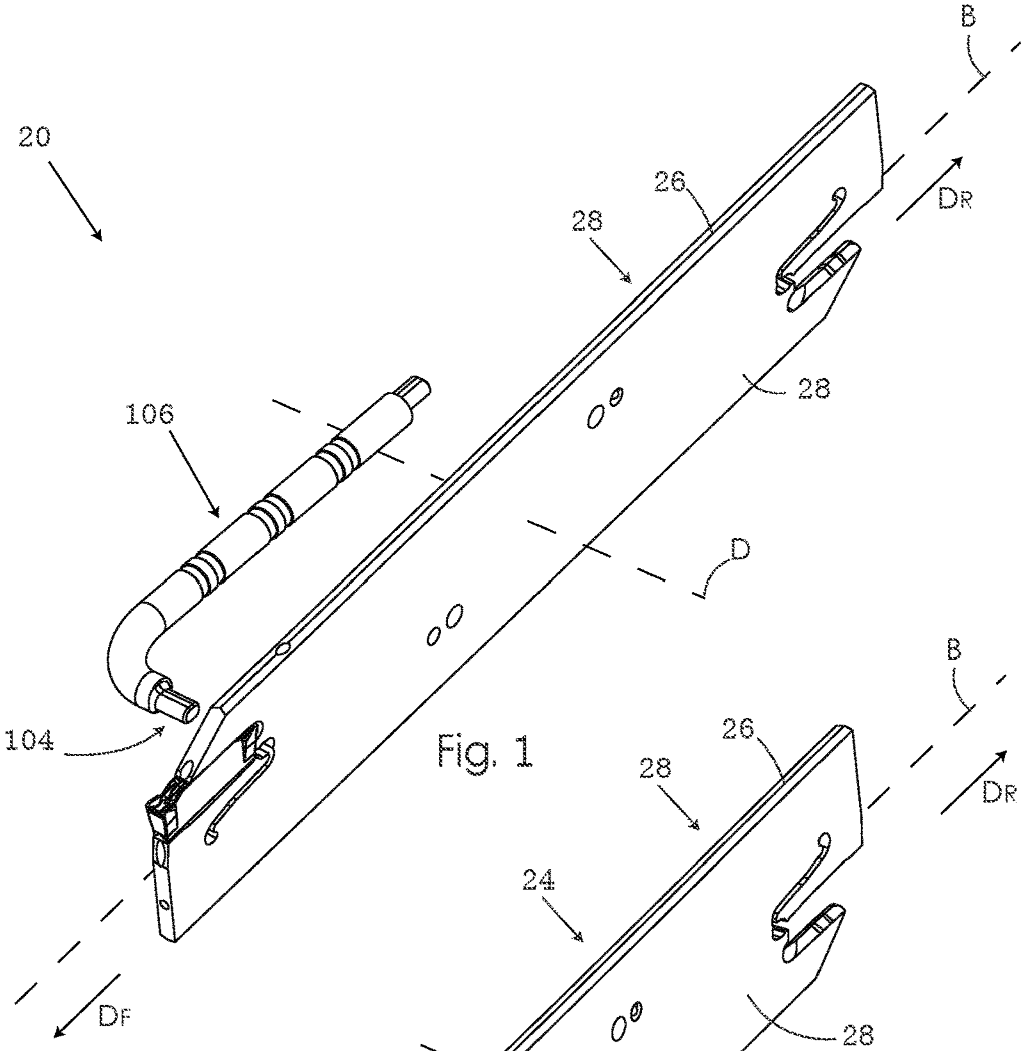
FIG. 1 is a perspective view of a cutting tool.
Figure 2:
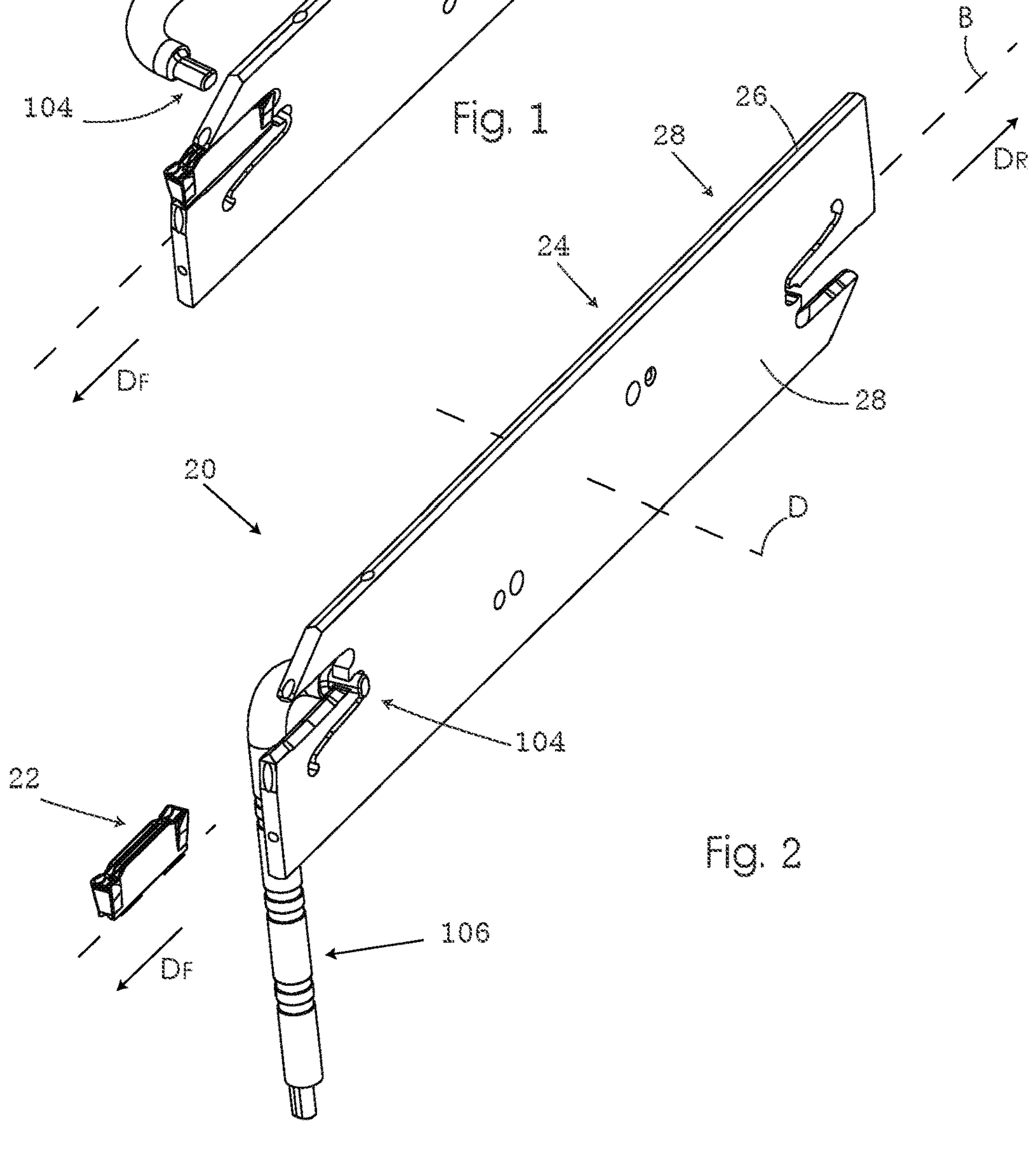
FIG. 2 is an exploded view of the cutting tool shown in FIG. 1.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is first drawn to FIG. 1 showing a cutting tool 20, for chip removal, in accordance with embodiments of the subject matter of the present application. The cutting tool 20 has a cutting insert 22 which can be typically made from cemented carbide. The cutting tool 20 also has a tool body 24 which can be typically made from steel. In this non-limiting example shown in the drawings, the cutting tool 20 is an external grooving tool and the cutting insert 22 is a grooving insert. The cutting tool 20 is adjustable between a released position and a fastened position. In the fastened position of the cutting tool 20, the cutting insert 22 is releasably attached to the tool body 24.

Figure 3:
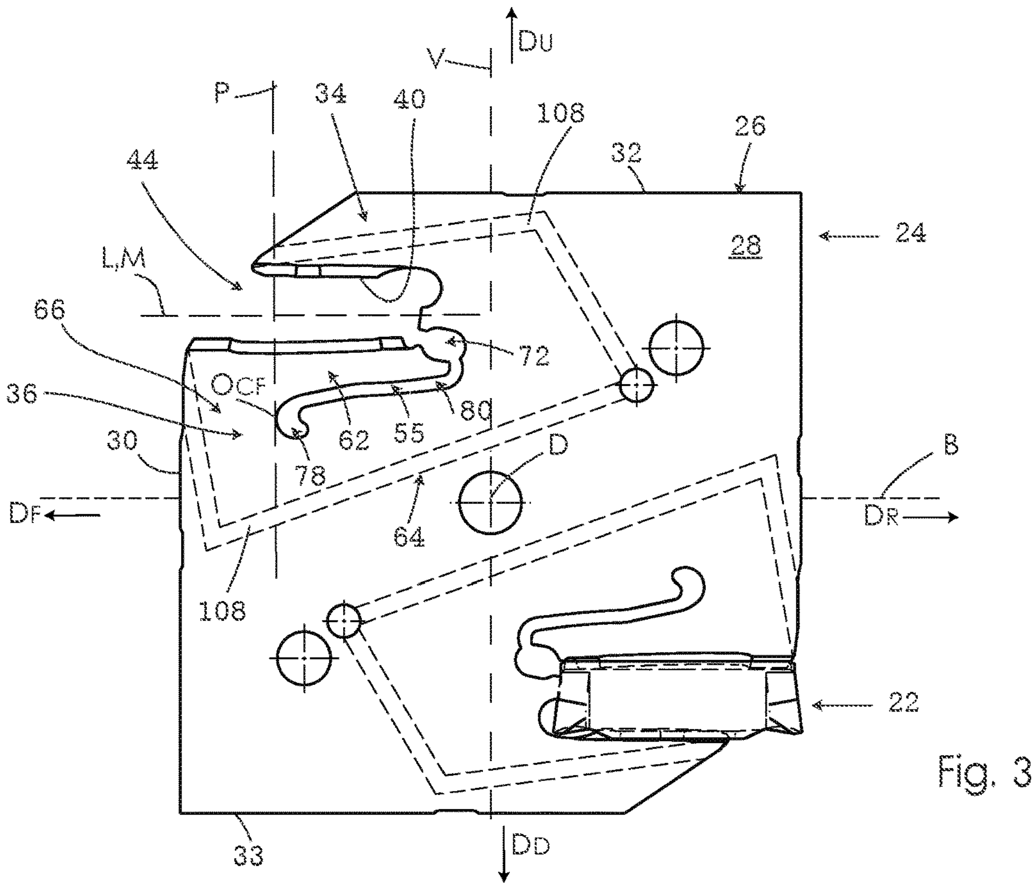
FIG. 3 is a side view of a tool body in a normally closed position, in accordance with the present application.
Figure 4:
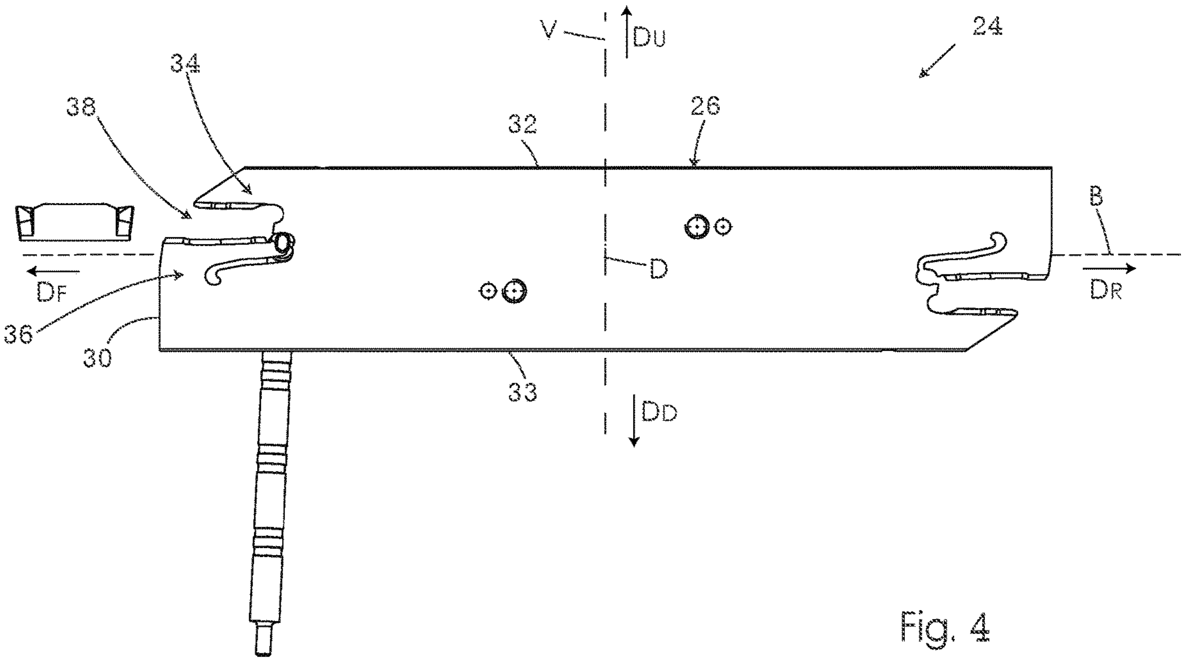
FIG. 4 is a side view of another tool body in an open position, with a prong of a key in a keyhole.
Figure 4A:
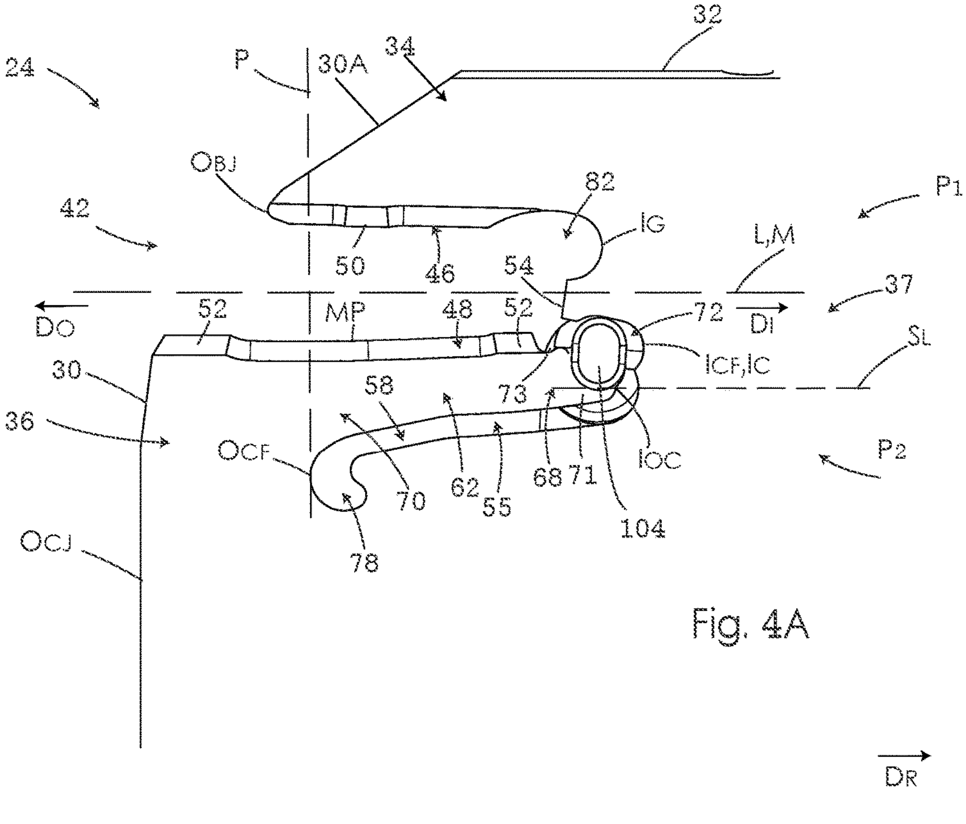
FIG. 4A is a detail of FIG. 4.

Attention is drawn now to FIGS. 3-4A showing a tool body 24 in accordance with a first aspect of the present application. The tool body 24 includes two body side surfaces 28 and a body peripheral surface 26 which extends therebetween. The body peripheral surface 26 extends circumferentially along a body lateral axis D. In accordance with some embodiments of the subject matter of the present application, the two body side surfaces 28 can be parallel to each other.

The tool body 24 has a body central axis B which may be perpendicular to, and intersect, the body lateral axis D. The body central axis B defines opposite forward to rearward directions $D_F$, $D_R$. The tool body 24 has a body vertical axis V which defines opposite upward to downward directions $D_U$, $D_D$. In some embodiments, the body vertical axis V is perpendicular to, and intersects, both the body lateral axis D and the body central axis B. In the non-limiting example shown in the figures, the tool body 24 is in the form of a blade, and is suitable for external grooving. In the non-limiting example shown in FIGS. 1-2 and 4-6, the tool body 24 is elongated along the body central axis B. The body central axis B can intersect the body forward end surface 30. It should be appreciated that use of the terms "upward" and "downward" throughout the description and claims refer to a relative position in a direction of the body vertical axis V towards the top and bottom, respectively, in FIGS. 3 and 4.

The body peripheral surface 26 includes a body forward end surface 30 at a forward end of the tool body 24. The body peripheral surface 26 includes opposite body upper and lower surfaces 32, 33 which intersect the body forward end surface 30. Stated differently, the body forward end surface 30 extends between the body upper and lower surfaces 32, 33. The body upper and lower surfaces 32, 33 are intersected by the body vertical axis V. In accordance with some embodiments of the subject matter of the present application, the body upper and lower surfaces 32, 33 can be parallel to each other. The body forward end surface 30 can include a chip evacuation surface 30A adjoining the body upper surface 32 which slopes away from body central axis B as it extends to the body upper surface 32 in the rearward direction $D_R$. The body central axis B can intersect the body forward end surface 30. It should be appreciated that use of the terms "forward" and "rearward" throughout the description and claims refer to a relative position in a direction of the body central axis B towards the left and right, respectively, in FIGS. 3 and 4.

As seen in FIGS. 3-3A and 4-4A, the tool body 24 includes two jaws, namely a base jaw 34 and a clamping jaw 36, which are spaced apart from each other. In this non-limiting example shown in FIGS. 3 and 4, the base jaw 34 is above the clamping jaw 36. That is to say, the base jaw 34 is an upper jaw and the clamping jaw 36 is a lower jaw, configured to support the cutting insert 22 against cutting forces F (see FIG. 6).

The base jaw 34 and the clamping jaw 36 are connected by a jaw connecting bridge 37. The base and clamping jaws 34, 36 and the jaw connecting bridge 37 are all integrally formed together to have unitary one-piece construction (also referred to as "monolithic" construction). In accordance with some embodiments of the subject matter of the present application, the base jaw 34 can be more rigid than the clamping jaw 36. In particular, the base jaw 34 can be rigid, unlike typical grooving/parting holders of the grip variety where the upper jaw is flexible (to allow insertion of an insert). This can be advantageous for chip evacuation since the base jaw 34 (in particular, the chip evacuation surface 30A) can be shaped optimally for such a function (i.e., chip removal) without any restrictions due to it having to be flexible.

The tool body 24 includes a clamping recess 38 recessed in the body peripheral surface 26. In this non-limiting example shown in the drawings, the clamping recess 38 is recessed in the body forward end surface 30. The clamping recess 38 opens out to the two body side surfaces 28. The clamping recess 38 is defined by a recess wall surface 40. The recess wall surface 40 extends continuously and intersects the body peripheral surface 26 at its two extremities, at the body forward end surface 30. The recess wall surface 40 extends between (i.e., intersects) the two body side surfaces 28. The clamping recess 38 includes an innermost clamping recess point $I_C$. It should be appreciated that use of the terms "outward" (and "outer" and "outermost") and "inward" (and "inner" and "innermost") throughout the description and claims refer to a relative position in a direction of the pocket axis L towards the left and right, respectively, in FIGS. 3A and 4A. It should also be appreciated that use of the term "point" when referred to a recess or gap (i.e. space) throughout the description and claims refer to a point on a wall surface that defines the space.

The clamping recess 38 includes an insert receiving pocket 42. The insert receiving pocket 42 is configured to receive a cutting insert therein. The insert receiving pocket 42 extends along a pocket axis L which defines opposite outward and inward directions $D_O$, $D_I$. The insert receiving pocket 42 can be elongated along the pocket axis L. The pocket axis L can be parallel to the body central axis B. The insert receiving pocket 42 opens out to the body peripheral surface 26 to form a pocket opening 44 at an outward end of the insert receiving pocket 42. The pocket axis L passes through the pocket opening 44. The insert receiving pocket 42 opens out to the body forward end surface 30 in the outward direction $D_O$ along the pocket axis L. In accordance with some embodiments of the subject matter of the present application, the chip evacuation surface 30A can extend between the insert receiving pocket 42 and the body upper surface 32.

The base and clamping jaws 34, 36 are spaced apart by the insert receiving pocket 42. In particular, the insert receiving pocket 42 is defined, at least partially, by pocket base and clamping surfaces 46, 48 formed on the base and clamping jaws 34, 36, respectively. Specifically, the pocket base and clamping surfaces 46, 48 are formed on opposing portions of the recess wall surface 40. The pocket base and clamping surfaces 46, 48 extend (in the outward direction $D_O$) to the body peripheral surface 26. The pocket axis L passes between the pocket base and clamping surfaces 46, 48. The pocket base and clamping surfaces 46, 48 include a pocket base abutment surface 50 and at least one pocket clamping abutment surface 52, respectively, for clamping engagement with corresponding surfaces on the cutting insert 22. It is noted that the pocket clamping surface 48 can include a single continuous pocket clamping abutment surface 52. Alternatively, the pocket clamping surface 48 can include two raised pocket clamping abutment surfaces 52 spaced apart from one another along the pocket axis L. Preferably, the pocket clamping surface 48 can include exactly two (spaced apart) pocket clamping abutment surfaces 52.

The insert receiving pocket 42 includes a pocket median plane M which contains the pocket axis L and passes in-between the pocket base and clamping surfaces 46, 48.

The pocket median plane M is parallel to the body lateral axis D. The pocket median plane M defines first and second plane sides P1, P2.

The base jaw 34 includes an outermost base jaw point $O_{BJ}$. The clamping jaw 36 includes an outermost clamping jaw point $O_{CJ}$. In accordance with some embodiments of the subject matter of the present application, the base jaw 34 can be shorter than the clamping jaw 36 in the outward direction $D_O$ along the pocket axis L. That is to say, the outermost clamping jaw point $O_{CJ}$ is located further outward along the pocket axis L than the outermost base jaw point $O_{BJ}$.

In accordance with some embodiments of the subject matter of the present application, the insert receiving pocket 42 can include an outward facing pocket stopper surface 54, for positioning the cutting insert 22 in a predetermined position along the pocket axis L. The pocket stopper surface 54 can be located on the jaw connecting bridge 37. The pocket stopper surface 54 can be intersected by the pocket axis L.

The clamping recess 38 includes a clamping flexibility recess 55 which extends from the insert receiving pocket 42. The innermost clamping recess point $I_C$ is located at the clamping flexibility recess 55. In accordance with some embodiments of the subject matter of the present application, the clamping flexibility recess 55 can extend from the insert receiving pocket 42 between the pocket stopper surface 54 and the pocket clamping surface 48.

The clamping flexibility recess 55 includes a minor clamping flexibility recess 56 and a major clamping flexibility recess 58, both described further below.

Figure 3A:
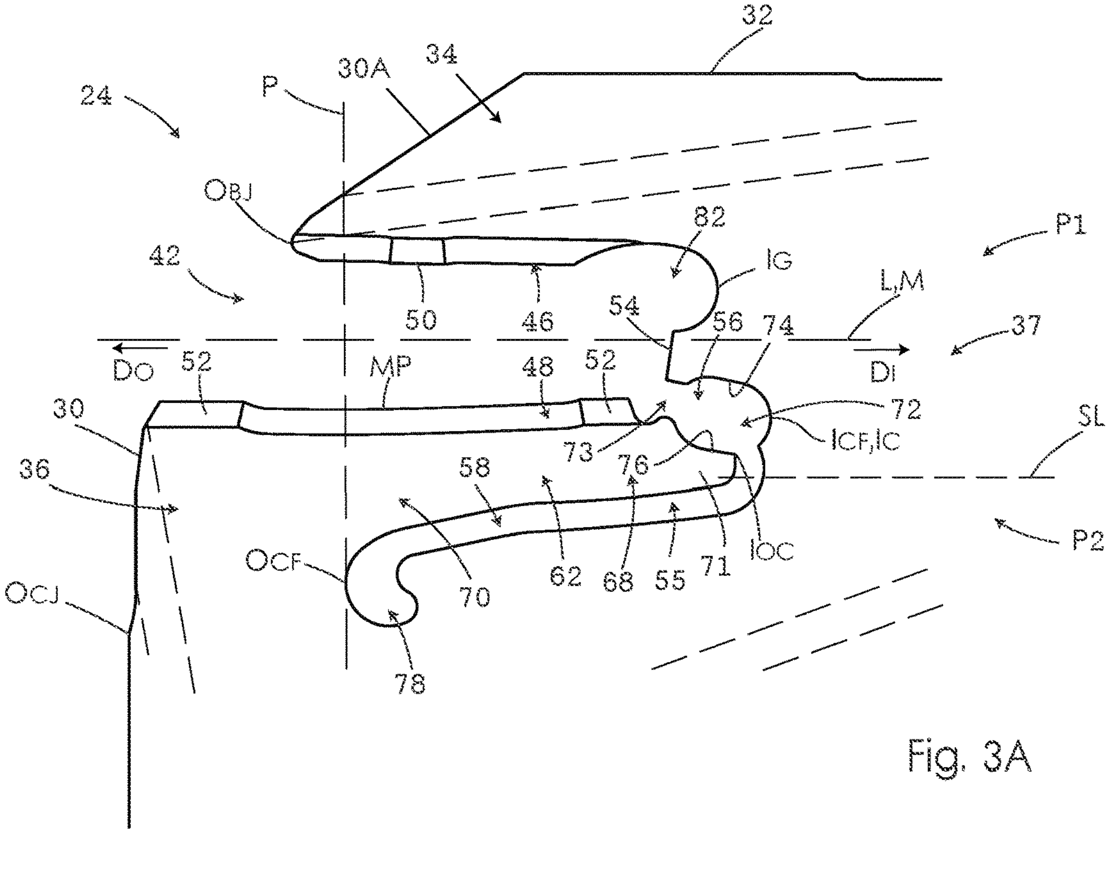
FIG. 3A is a detail of FIG. 3.

Referring to FIGS. 3A and 4A, the clamping flexibility recess 55 includes an outermost clamping flexibility recess point $O_{CF}$ which is formed on the major clamping flexibility recess 58 and an innermost clamping flexibility recess point $I_{CF}$ which can be formed on the minor clamping flexibility recess 56. The innermost clamping recess point $I_C$ and the innermost clamping flexibility recess point $I_{CF}$ coincide with each other. In accordance with some embodiments of the subject matter of the present application, the outermost clamping flexibility recess point $O_{CF}$ can be located further outward than a mid-point MP of the pocket clamping surface 48, the mid-point MP being located half-way along the length of the pocket clamping surface 48 in a direction along the pocket axis L. The outermost clamping flexibility recess point $O_{CF}$ can be located further inward than the outermost base jaw point $O_{BJ}$.

The clamping flexibility recess 55 includes a recess termination portion 78 located where clamping flexibility recess 55 terminates. In accordance with some embodiments of the subject matter of the present application, the recess termination portion 78 can form an outermost portion of the clamping flexibility recess 55. That is to say, the outermost clamping flexibility recess point $O_{CF}$ can be located at the recess termination portion 78.

In accordance with some embodiments of the subject matter of the present application, the minor clamping flexibility recess 56 extends from the insert receiving pocket 42. The minor clamping flexibility recess 56 can be located on the second plane side P2 of the pocket median plane M.

The major clamping flexibility recess 58 can be elongated. The major clamping flexibility recess 58 merges with (i.e., extends from) the minor clamping flexibility recess 56. Specifically, the major clamping flexibility recess 58 merges with the minor clamping flexibility recess 56 in a region where clamping flexibility recess 55 changes direction in the inward and outward directions $D_I$,$D_O$. The major clamping flexibility recess 58 may have a serpentine shape, as it extends from the minor clamping flexibility recess 56. The major clamping flexibility recess 58 is further from the pocket axis L than the minor clamping flexibility recess 56. The major clamping flexibility recess 58 terminates at the recess termination portion 78. In accordance with some embodiments of the subject matter of the present application, the major clamping flexibility recess 58 can be located on the second plane side P2 of the pocket median plane M. Thus, both the minor clamping flexibility recess 56 and the major clamping flexibility recess 58 can both be located on the same side of the pocket median plane M.

It is noted that the clamping flexibility recess 55 and the insert receiving pocket 42 are distinct portions of the clamping recess 38. That is to say, no portion of one is contained in any portion of the other. Likewise, the minor and major clamping flexibility recesses 56, 58 are both distinct portions of the clamping flexibility recess 55.

Referring to FIG. 3, the clamping jaw 36 includes a flexible overhanging clamping portion 62, and a fixed clamping portion 64 connected by a hinge clamping portion 66. The flexible overhanging clamping portion 62 can be delimited in the outward direction by an overhang plane P oriented perpendicular to the pocket axis L and tangentially touching the outermost clamping flexibility recess point $O_{CF}$. In this non-limiting example shown in the drawings, the hinge clamping portion 66 is supported from below by the fixed clamping portion 64, i.e., does not have an overhang portion, thereby improving stability of the cutting insert 22 below the cutting region during cutting operations. Also, the hinge clamping portion 66 is adjacent the body forward end surface 30. The flexible overhanging clamping portion 62 includes an innermost overhanging clamping portion point $I_{OC}$. In accordance with some embodiments of the subject matter of the present application, referring to FIGS. 3A and 4A, the minor and major clamping flexibility recesses 56, 58 can be separated by an imaginary separation plane SL which contains the innermost overhanging clamping portion point $I_{OC}$ and which is oriented parallel to the pocket median plane M and the pocket axis L.

The flexible overhanging clamping portion 62 is delimited by the insert receiving pocket 42 and the clamping flexibility recess 55. In accordance with some embodiments of the subject matter of the present application, the flexible overhanging clamping portion 62 is delimited on one side of the imaginary separation plane SL by the insert receiving pocket 42 and the minor clamping flexibility recess 56. Moreover, the flexible overhanging clamping portion 62 is delimited on an opposite side of the imaginary separation plane SL by the major clamping flexibility recess 58.

Figure 5:
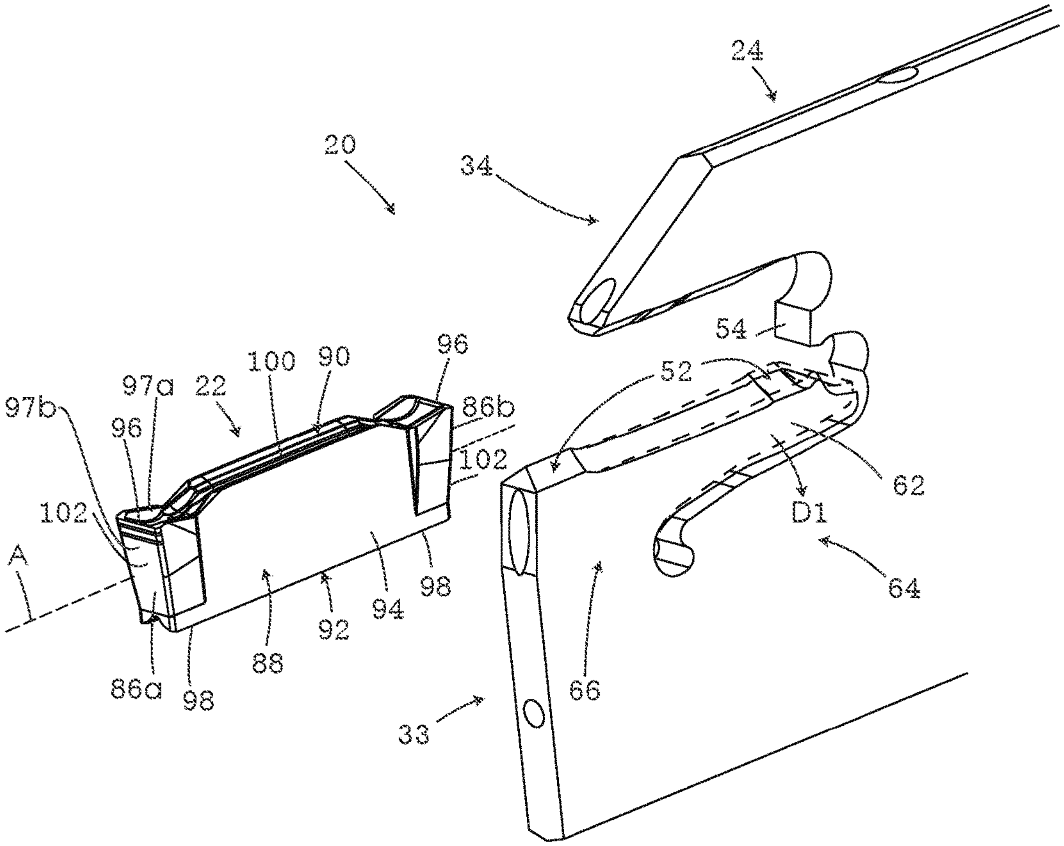
FIG. 5 is a perspective view of an insert receiving pocket of the tool body shown in FIG. 4, with a flexible overhanging clamping portion of the tool body in the normally closed position superimposed as a dashed line.

Making reference to FIG. 5, the flexible overhanging clamping portion 62 is resiliently displaceable towards the fixed clamping portion 64 (about the hinge clamping portion 66) along a jaw opening direction D1 (see FIG. 5).

The flexible overhanging clamping portion 62 includes opposite free and fixed ends 68, 70. The fixed end 70 is connected to the hinge clamping portion 66. Thus, the flexible overhanging clamping portion 62 is cantilevered, and thus may also be referred to as flexible overhanging clamping portion 62 cantilevered in the inward direction of the insert receiving pocket 42. The fixed end 70 is closer to the pocket opening 44 than the free end 68.

The flexible overhanging clamping portion 62 is elongated. In accordance with some embodiments of the subject matter of the present application, the flexible overhanging clamping portion 62 can taper in a direction towards the free end 68. It is appreciated that the free end 68 is more resiliently displaceable than the fixed end 70. It is further noted that the major clamping flexibility recess 58 merges with the minor clamping flexibility recess 56 adjacent a tip of the flexible overhanging clamping portion 62 (at the free end 68). In accordance with some embodiments of the subject matter of the present application, the innermost overhanging clamping portion point $I_{OC}$ can be located further inward along the pocket axis L than the pocket stopper surface 54.

In accordance with some embodiments of the subject matter of the present application, the flexible overhanging clamping portion 62 includes a key fulcrum 71 located at the free end 68, inward from the at least one pocket clamping abutment surface 52.

In the configuration with one pocket clamping abutment surface 52, said one pocket clamping abutment surface 52 is located partly on the flexible overhanging clamping portion 62 and partly on the hinge clamping portion 66. In the configuration with two pocket clamping abutment surfaces 52, one of the two pocket clamping abutment surfaces 52 is located on the flexible overhanging clamping portion 62 (preferably, at the free end 68) and the other one of the two pocket clamping abutment surfaces 52 is located on the hinge clamping portion 66. Stated differently, the divided pocket clamping abutment surface 52 is located on the flexible overhanging clamping portion 62 and also on the hinge clamping portion 66.

As seen in FIGS. 3A and 4A, reverting to the clamping flexibility recess 55, the clamping flexibility recess 55 includes a keyhole portion 72. The keyhole portion 72 is designed to receive a prong of a key, as described later in the description. The keyhole portion 72 is non-circular. The keyhole portion 72 can be oval-shaped. The keyhole portion 72 is located at least in the minor clamping flexibility recess 56. In accordance with some embodiments of the subject matter of the present application, the keyhole portion 72 can be located entirely in the minor clamping flexibility recess 56. The keyhole portion 72 can be spaced apart from with the insert receiving pocket 42. The keyhole portion 72 can be spaced apart from with the insert receiving pocket 42 by a mouthing portion 73. In a side view of the tool body 24 (i.e., along the body lateral axis D), the mouthing portion 73 can be narrower than the keyhole portion 72. The keyhole portion 72 can be spaced apart from the major clamping flexibility recess 58. The innermost clamping recess point $I_C$ can be located at the keyhole portion 72.

In accordance with some embodiments of the subject matter of the present application, the keyhole portion 72 includes keyhole bearing and biasing surfaces 74, 76. The keyhole bearing and biasing surfaces 74, 76 are formed on the recess wall surface 40. Generally speaking, the keyhole bearing and biasing surfaces 74, 76 can face each other. In a side view of the tool body 24 the keyhole bearing and biasing surfaces 74, 76 can be concave curved. The keyhole bearing surface 74 can be located on the jaw connecting bridge 37.

In accordance with some embodiments of the subject matter of the present application, the keyhole biasing surface 76 can be located on the flexible overhanging clamping portion 62. In particular, the keyhole biasing surface 76 can be located on the free end 68 of the flexible overhanging clamping portion 62. Further in particular, the keyhole biasing surface 76 can be located on the key fulcrum 71. The keyhole biasing surface 76 can be located at least partially further inward than the pocket stopper surface 54. In some configurations, the keyhole biasing surface 76 can be located entirely further inward than the pocket stopper surface 54.

Reverting to FIG. 3, in accordance with some embodiments of the subject matter of the present application, the clamping flexibility recess 55 can include a recess slit portion 80. The recess slit portion 80 can be located at the minor clamping flexibility recess 56 and/or the major clamping flexibility recess 58. The recess slit portion 80 can merge with the keyhole portion 72. The recess slit portion 80 can merge with the recess termination portion 78. The recess slit portion 80 can be elongated. In a side view of the tool body 24 (i.e., along the body lateral axis D), the recess slit portion 80 can be narrower than the keyhole portion 72. Likewise, in a side view of the tool body 24, the recess slit portion 80 can be narrower than the recess termination portion 78.

In accordance with some embodiments of the subject matter of the present application, the clamping recess 38 can include an insert clearance gap 82 which merges with the insert receiving pocket 42 between the pocket stopper surface 54 and the pocket base surface 46. The insert clearance gap 82 is designed to accommodate a non-active cutting edge 96*b* of the cutting insert 22 when the cutting tool 20 is assembled (see FIG. 6). It is noted that the insert clearance gap 82 does not provide any flexibility to the base jaw 34 with respect to the clamping jaw 36. The insert clearance gap 82 can be located on the first plane side P1 of the pocket median plane P. The insert clearance gap 82 includes an innermost clearance gap point $I_G$. It is noted that the innermost overhanging clamping portion point $I_{OC}$ is located further inward along the pocket axis L than the innermost clearance gap point $I_G$.

Reference is now made to FIG. 5, showing inter alia, the cutting insert 22. The cutting insert 22 is integrally formed to have a unitary one-piece construction (i.e., "monolithic" construction). The cutting insert 22 includes two opposite insert end surfaces 86*a*, 86*b*, namely a first insert end surface 86*a* and a second insert end surface 86*b*. The cutting insert 22 further includes an insert peripheral surface 88 extending between the two insert end surfaces 86*a*, 86*b*. The insert peripheral surface 88 extends circumferentially about an insert central axis A. The insert peripheral surface 88 includes opposite insert upper and lower surfaces 90, 92 and two opposite insert side surfaces 94 all connecting the two insert end surfaces 86*a*, 86*b*. The cutting insert 22 is devoid of a through hole, for a retaining screw. In accordance with some embodiments of the subject matter of the present application, the insert central axis A can define a length direction of the insert, i.e., the direction in which the cutting insert 22 is longitudinally elongated and has its longest dimension.

In this non-limiting example shown in the drawings, the cutting insert 22 includes two cutting edges 96 formed at the intersection of the insert upper surface 90 and the two insert end surfaces 86*a*, 86*b*, respectively. Stated differently, the cutting insert 22 can be double-ended and can be two-way indexable. However, it is noted that the present invention is not limited to double-ended cutting inserts. For example, the present invention also applies to single-ended cutting inserts having a single cutting edge 96 formed at the intersection of the insert upper surface 90 and the first insert end surface 86*a*. A portion of the insert upper surface 90 adjacent each cutting edge 96 serves as a rake surface 97*a*. A portion of each insert end surface 86*a*, 86*b* adjacent each cutting edge 96 serves as a relief surface 97*b*.

The insert lower surface 92 includes at least one insert lower abutment surface 98. In accordance with some embodiments of the subject matter of the present application, the at least one insert lower abutment surface 98 can extend parallel to the insert central axis A. In accordance with some other embodiments of the subject matter of the present application, the insert lower surface 92 can include two insert lower abutment surfaces 98 which are offset (i.e., spaced apart from one another) along the insert central axis A. Preferably, the insert lower surface 92 can include exactly two insert lower abutment surfaces 98. Each of the insert lower abutment surfaces 98 can be concavely v-shaped, complementarily corresponding to the shape of the pocket clamping abutment surface(s) 52.

The insert upper surface 90 includes an insert upper abutment surface 100. The insert upper abutment surface 100 is for abutting a corresponding surface in the insert receiving pocket 42. The insert upper abutment surface 100 face mutually away from the at least one insert lower abutment surface 98 (stated differently, the insert upper abutment surface 100 and the at least one insert lower abutment surface 98 face away from each other). The insert upper abutment surface 100 can be concavely v-shaped, complementarily corresponding to the shape of the pocket base abutment surface 50.

Each cutting edge 96 is associated with an insert stopper surface 102 which is formed on the insert end surface 86*a*, 86*b* at which the respective cutting edge 22 is not formed. For example, the cutting edge 96 formed at the intersection of the insert upper surface 90 and the first insert end surface 86*a* is associated with the insert stopper surface 102 formed on the second insert end surface 86*b*. In this non-limiting example shown in the drawings, each insert end surfaces 86*a*, 86*b* can include a respective insert stopper surface 102, with each respective insert stopper surface 102 being associated with a different cutting edge 96. The insert stopper surface 102 is for abutting the corresponding pocket stopper surface 54 in the insert receiving pocket 42. Each insert stopper surface 102 can be planar.

Figure 6:
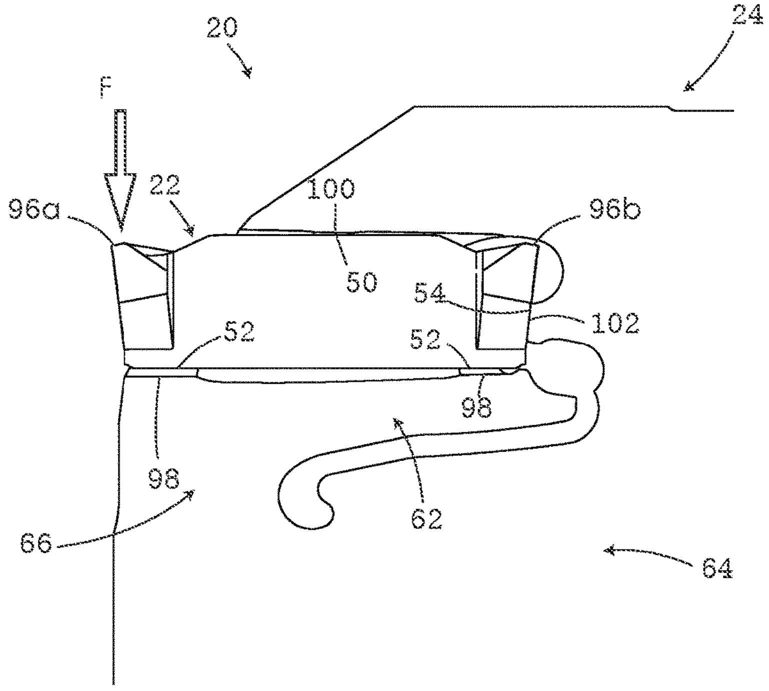
FIG. 6 is a side view of the cutting tool shown in FIG. 1.

Reference is now made to FIG. 6, showing the cutting tool 20, in accordance with the subject matter of a second aspect of the present application. The cutting tool 20 includes the cutting insert 22 releasably and resiliently clamped in the insert receiving pocket 42 of the tool body 24 between the base and clamping jaws 34, 36. The cutting edge 96 that is outermost (and proximate the pocket opening 44) forms an active cutting edge 96*a*, while any other cutting edge(s) 96 form non-active cutting edges 96*b*.

Assembly of the cutting tool 20 (i.e., adjusting the cutting tool 20 to the assembled position) is accomplished by performing the following steps. Firstly, a non-circular prong 104 of a key 106 is inserted into the keyhole portion 72. The prong 104 can be oval-shaped. Making reference to FIG. 4A, the key 106 is turned thereby rotating the prong 104. The prong comes into contact with the keyhole bearing and biasing surfaces 74, 76. Further turning of the key (and rotation of the prong 104) resiliently displaces the flexible overhanging clamping portion 62 towards the fixed clamping portion 64 (about the hinge clamping portion 66) along the jaw opening direction D1. As seen in FIG. 5, such displacement increases the height dimension of the insert receiving pocket 42 and allows the cutting insert 22 to be inserted into the insert receiving pocket 42, starting by placing it adjacent to the pocket opening 44 and moving it in the inward direction $D_I$. Once the cutting insert 22 is in the desired position (preferably when contact is made between the insert stopper surface 102 and the pocket stopper surface 54), the key 106 is turned again (or turned in the opposite direction). Due to the resilience of the flexible overhanging clamping portion 62 the tool body is urged to return to its original normally closed position (i.e., to move in a direction opposite the jaw opening direction D1), thereby clamping the cutting insert 22 between the base and clamping jaws 34, 36 and forming the assembled position of the cutting tool 20. Extraction of the cutting insert 22 is performed in a similar manner.

In the assembled position of the cutting tool 20, the at least one pocket clamping abutment surface 52 abuts the at least one insert lower abutment surface 98. The pocket base abutment surface 50 abuts the insert upper abutment surface 100. In accordance with some embodiments of the subject matter of the present application, the pocket stopper surface 54 can abut the insert stopper surface 102.

It is noted that by virtue of the foregoing, the base jaw 34 and/or the clamping jaw 36 can be devoid of a through hole which opens out to the two body side surfaces 28 and which is spaced apart from the clamping recess 38, for having a prong of a two-pronged key inserted therein when inserting and/or extracting the cutting insert 22 (such as seen in aforementioned U.S. Pat. No. 9,033,622). Thus, the provision of a cooling channel 108 is made easier since the path of such a channel is unimpeded by such a through hole.

Although the subject matter of the present application has been described to a certain degree of particularity, it should be understood that various alterations and modifications could be made without departing from the spirit or scope of the invention as hereinafter claimed. For example, the tool body 24 can be disc-shaped having a plurality of peripherally disposed insert receiving pockets and may be suitable for slot milling.

What is claimed is:

1. A tool body (24) having a body central axis (B) defining opposite forward to rearward directions ($D_F$, $D_R$), the tool body (24) comprising:

two body side surfaces (28) and a body peripheral surface (26) extending therebetween, the body peripheral surface (26) including a body forward end surface (30) at a forward end of the tool body (24), the body peripheral surface (26) extending circumferentially along a body lateral axis (D) which is perpendicular to, and intersects, the body central axis (B);

a base jaw (34) and a clamping jaw (36) spaced apart from each other and connected by a jaw connecting bridge (37);

a clamping recess (38) recessed in the body peripheral surface (26) and opening out to the two body side surfaces (28), the clamping recess (38) comprising:

an insert receiving pocket (42) extending along a pocket axis (L) defining opposite outward and inward directions ($D_O$, $D_I$), the insert receiving pocket (42) having a pocket opening (44) which opens out to the body forward end surface (30) in the outward direction ($D_O$) along the pocket axis (L), the insert receiving pocket (42) being defined, at least partially, by pocket base and clamping surfaces (46, 48) formed on the base and clamping jaws (34, 36), respectively;

a clamping flexibility recess (55) extending from the insert receiving pocket (42) and terminating at a recess termination portion (78), the clamping flexibility recess (55) comprising a keyhole portion (72) configured and designed to receive a prong of a key; wherein:

the clamping jaw (36) comprises a flexible overhanging clamping portion (62) and a fixed clamping portion (64) connected by a hinge clamping portion (66), the hinge clamping portion (66) being adjacent the body forward end surface (30);

the flexible overhanging clamping portion (62) is delimited by the insert receiving pocket (42) and the clamping flexibility recess (55);

the flexible overhanging clamping portion (62) comprises opposite free and fixed ends (68, 70), the fixed end (70) being closer to the pocket opening (44) than the free end (68); and the clamping recess (38) comprises an innermost clamping recess point ($I_C$) which is located at the clamping flexibility recess (55).

2. The tool body (24), according to claim 1, wherein:

the clamping flexibility recess (55) comprises:

a major clamping flexibility recess (58); and a minor clamping flexibility recess (56);

the flexible overhanging clamping portion (62) is delimited on one side by the major clamping flexibility recess (58) and on an opposite side by the insert receiving pocket (42) and the minor clamping flexibility recess (56); and the keyhole portion (72) is located at least in the minor clamping flexibility recess (56).

3. The tool body (24), according to claim 2, wherein:

the keyhole portion (72) is located entirely in the minor clamping flexibility recess (56).

4. The tool body (24), according to claim 3, wherein:

the keyhole portion (72) is spaced apart from the major clamping flexibility recess (58).

5. The tool body (24), according to claim 1, wherein:

the keyhole portion (72) is spaced apart from the insert receiving pocket (42).

6. The tool body (24), according to claim 1, wherein:

the flexible overhanging clamping portion (62) is resiliently displaceable about the hinge clamping portion (66) towards the fixed clamping portion (64) along a jaw opening direction (D1).

7. The tool body (24), according to claim 1, wherein:

the keyhole portion (72) comprises keyhole bearing and biasing surfaces (74, 76), the keyhole bearing surface (74) being located on the jaw connecting bridge (37).

8. The tool body (24), according to claim 7, wherein:

the keyhole biasing surface (76) is located on the flexible overhanging clamping portion (62).

9. The tool body (24), according to claim 1, wherein:

the clamping flexibility recess (55) comprises a recess slit portion (80) merging with the keyhole portion (72) and the recess terminating portion (78); and in a side view of the tool body (24), the recess slit portion (80) is narrower than the keyhole portion (72).

10. The tool body (24), according to claim 9, wherein:

in a side view of the tool body (24), the recess slit portion (80) is narrower than the recess termination portion (78).

11. The tool body (24), according to claim 1, wherein:

the pocket base and clamping surfaces (46, 48) comprise a pocket base abutment surface (50) and at least one pocket clamping abutment surface (52), respectively, for clamping engagement with corresponding surfaces on a cutting insert, the at least one pocket clamping abutment surface (52) being located on the flexible overhanging clamping portion (62) and on the hinge clamping portion (66).

12. The tool body (24), according to claim 11, wherein:

the pocket clamping surface (48) comprises two raised pocket clamping abutment surfaces (52) spaced apart from one another along the pocket axis (L); and one of the two pocket clamping abutment surfaces (52) is located on the flexible overhanging clamping portion (62) and the other one of the two pocket clamping abutment surfaces (52) is located on the hinge clamping portion (66).

13. The tool body (24), according to claim 1, wherein:

the insert receiving pocket (42) comprises an outward facing pocket stopper surface (54), for positioning a cutting insert in a predetermined position along the pocket axis (L).

14. The tool body (24), according to claim 13, wherein:

the flexible overhanging clamping portion (62) comprises an innermost overhanging clamping portion point ($I_{OC}$);

the innermost overhanging clamping portion point ($I_{OC}$) is located further inward along the pocket axis (L) than the pocket stopper surface (54).

15. The tool body (24), according to claim 13, wherein:

the pocket stopper surface (54) is located on the jaw connecting bridge (37) and is intersected by the pocket axis (L).

16. The tool body (24), according to claim 15, wherein:

the clamping flexibility recess (55) extends from the insert receiving pocket (42) between the pocket stopper surface (54) and the pocket clamping surface (48).

17. The tool body (24), according to claim 15, wherein:

the keyhole biasing surface (76) is located on the free end (68) of the flexible overhanging clamping portion (62).

18. The tool body (24), according to claim 15, wherein:

the clamping flexibility recess (55) comprises:

a major clamping flexibility recess (58); and a minor clamping flexibility recess (56);

the flexible overhanging clamping portion (62) is delimited on one side by the major clamping flexibility recess (58), and on another side by the insert receiving pocket (42) and the minor clamping flexibility recess (56); and the keyhole portion (72) is located at least in the minor clamping flexibility recess (56);

the insert receiving pocket (42) comprises a pocket median plane (M) containing the pocket axis (L) and extending between the pocket base and clamping surfaces (46, 48), the pocket median plane (M) being parallel to the body lateral axis (D); and the minor and major clamping flexibility recesses (56, 58) are both located on a common, second plane side (P2) of the pocket median plane (M).

19. The tool body (24), according to claim 18, wherein:

the clamping recess (38) comprises an insert clearance gap (82) merging with the insert receiving pocket (42) between the pocket stopper surface (54) and the pocket base surface (46); and the insert clearance gap (82) is located on an opposite, first plane side (P1) of the pocket median plane (M).

20. The tool body (24), according to claim 1, wherein:

the clamping flexibility recess (55) comprises an outermost clamping flexibility recess point ($O_{CF}$), along the pocket axis (L); and the outermost clamping flexibility recess point ($O_{CF}$) is located further outward than a mid-point (MP) of the pocket clamping surface (48), the mid-point (MP) being located half-way along the length of the pocket clamping surface (48) in a direction along the pocket axis (L).

21. The tool body (24), according to claim 20, wherein:

the base jaw (34) comprises an outermost base jaw point ($O_{BJ}$); and the outermost clamping flexibility recess point ($O_{CF}$) is located further inward along the pocket axis (L) than the outermost base jaw point ($O_{BJ}$).

22. The tool body (24), according to claim 1, wherein:

the base jaw (34) is rigid.

23. The tool body (24), according to claim 1, wherein:

the clamping jaw (36) is devoid of a through hole opening out to the two body side surfaces (28) and spaced apart from the clamping recess (38).

24. The tool body (24), according to claim 1, wherein:

the base jaw (34) is shorter than the clamping jaw (36) in the outward direction ($D_O$) along the pocket axis (L).

25. A cutting tool (20) comprising:

a tool body (24) in accordance with claim 1; and a cutting insert (22), releasably and resiliently clamped in the insert receiving pocket (42) between the base and clamping jaws (34, 36).

26. The cutting tool (20) according to claim 25, wherein:

the cutting insert (22) is longitudinally elongated in a direction defining an insert central axis (A) and comprises:

opposite first and second insert end surfaces (86*a*, 86*b*) and an insert peripheral surface (88) extending therebetween, the insert peripheral surface (88) extending circumferentially about the insert central axis (A) and comprising opposite insert upper and lower surfaces (90, 92) and two opposite insert side surfaces (94) which all connect the first and second insert end surfaces (86*a*, 86*b*); and a cutting edge (96) formed at the intersection of the insert upper surface (90) and the first insert end surface (86*a*); wherein:

the insert lower surface (92) comprises at least one insert lower abutment surface (98);

the insert upper surface (90) comprises an insert upper abutment surface (100) which mutually faces away from the at least one insert lower abutment surface (98); and the second insert end surface (86*b*) comprises an insert stopper surface (102).

27. The cutting tool (20), according to claim 26, wherein:

the pocket base and clamping surfaces (46, 48) comprise a pocket base abutment surface (50) and at least one pocket clamping abutment surface (52), respectively, for clamping engagement with corresponding surfaces on the cutting insert, the at least one pocket clamping abutment surface (52) being located on the flexible overhanging clamping portion (62) and on the hinge clamping portion (66);

the at least one pocket clamping abutment surface (52) abuts the at least one insert lower abutment surface (98); and the pocket base abutment surface (50) abuts the insert upper abutment surface (100).

28. The cutting tool (20), according to claim 26, wherein:

the insert receiving pocket (42) comprises an outward facing pocket stopper surface (54), for positioning the cutting insert in a predetermined position along the pocket axis (L); and the pocket stopper surface (54) abuts the insert stopper surface (102).

* * * * *